July 29, 1969     B. C. EISENBERG     3,457,711
CUCUMBER HARVESTER Filed June 17, 1965     11 Sheets-Sheet 1

INVENTOR.
BERNARD C. EISENBERG
BY Kenyon & Kenyon
ATTORNEYS

July 29, 1969  B. C. EISENBERG  3,457,711
CUCUMBER HARVESTER
Filed June 17, 1965 11 Sheets-Sheet 2

INVENTOR.
BERNARD C. EISENBERG
BY
Kenyon & Kenyon
ATTORNEY

July 29, 1969  B. C. EISENBERG  3,457,711
CUCUMBER HARVESTER

Filed June 17, 1965  11 Sheets-Sheet 3

INVENTOR.
BERNARD C. EISENBERG
BY
Kenyon & Kenyon
ATTORNEYS

July 29, 1969    B. C. EISENBERG    3,457,711
CUCUMBER HARVESTER
Filed June 17, 1965    11 Sheets-Sheet 5

INVENTOR.
BERNARD C. EISENBERG
BY Kenyon & Kenyon
ATTORNEY

July 29, 1969  B. C. EISENBERG  3,457,711
CUCUMBER HARVESTER

Filed June 17, 1965  11 Sheets-Sheet 10

INVENTOR.
BERNARD C. EISENBERG
BY
Kenyon & Kenyon
ATTORNEYS

July 29, 1969  B. C. EISENBERG  3,457,711
CUCUMBER HARVESTER

Filed June 17, 1965  11 Sheets-Sheet 11

INVENTOR.
BERNARD C. EISENBERG
BY
Kenyon & Kenyon
ATTORNEY

United States Patent Office 3,457,711
Patented July 29, 1969

3,457,711
CUCUMBER HARVESTER
Bernard C. Eisenberg, Rockaway, N.J. (% Solbern Manufacturing Corporation, Box 567, Caldwell, N.J. 07006)
Filed June 17, 1965, Ser. No. 464,651
Int. Cl. A01d 45/00
U.S. Cl. 56—327             46 Claims

ABSTRACT OF THE DISCLOSURE

The method and machine of the disclosure relate to the harvesting of cucumbers. In accordance with the invention, the cucumber harvesting machine comprises means for conveying cucumber vines extending from the ground relative to the machine, along a path of travel which is elevated above the ground, at a speed relative to the machine and substantially equal and opposite to the speed of the machine relative to the ground. The machine additionally comprises means for supporting the conveyed vines with the cucumbers hanging therefrom and means for moving the hanging cucumbers in a direction transverse with respect to the path of travel of the machine to impart relative motion between the vines and the attached cucumbers, thereby to remove the cucumbers from the vines.

---

This invention relates to a machine for harvesting vegetables and fruit from vines adjacent to the ground and more in particular to a machine for harvesting cucumbers.

When harvesting a crop which matures and ripens over a period of time, one of the most serious problems encountered is that of removing the fruit or vegetable without damaging the plant or vine upon which the crop is growing. An example of this is in the harvesting of cucumbers. Cucumbers mature over a period of weeks during the growing season and therefore any damaging of the vine results in the loss of the remaining production of the vine. Since the vines can be easily damaged and since they tend to grow along the ground in random directions from the row in which they are planted, most cucumber crops are harvested by hand picking. The fact that cucumber vines grow close to the ground and are partially hidden by the leaves of the vine makes the task of hand-harvesting cucumbers a slow and exhaustive type of work. As a result of the arduous nature of hand picking, and of economic reasons, it is oftentimes difficult to obtain workers for harvesting crops such as cucumbers.

In attempting to mechanize the harvesting in the past, it was discovered that the random orientation of the vines could be controlled by training the vines to grow in a predetermined direction with respect to the row in which they are planted. Thus by training the vines to grow outwardly from one side of the row, it becomes possible to operate a machine over the vines of a row without running over the vines which would necessarily occur if the vines grew in a random direction.

Once having discovered that the vines could be trained, various machines were developed in order to perform the harvesting operation. In certain machines attempts were made to grasp the cucumbers between elastic members or cushioned members and to pull the cucumbers from the stem. One of the difficulties encountered in such a machine is that the stem connecting the cucumber to the vine provides a strong attachment which can very possibly, if not probably, injure the vine when attempting to pull the cucumber from the stem.

In other machines the cucumbers were conveyed through the machine and while being conveyed, struck by bars moving in a transverse direction so that the cucumbers were severed from the stem or vine.

In each of the machines discussed thus far, the attempt has been made to harvest the crop while the vine is still extending from the ground. Yet in another machine the procedure has been to cut the vine from the ground and then to shake the cucumbers from the vine. Such a machine as last mentioned is generally undesirable because of the fact that the crop matures over a period of weeks and therefore requires a number of pickings before the vines are exhausted.

It is therefore one of the objects of the invention to provide a machine which is capable of harvesting cucumbers without damaging the vines upon which the cucumbers are growing.

It is another object of the invention to provide a machine for harvesting cucumbers which is adapted to pick the fully grown cucumbers and to leave the remainder behind for further growth.

It is still another object of the invention to provide a machine for harvesting cucumbers which are trained to grow in a predetermined direction with respect to the row in which the vines are planted.

It is an additional object of the invention to provide a machine which can elevate the vines from the ground, harvest the cucumbers, and return the vine to the ground as the machine moves adjacent to the row of lines.

It is a further object of the invention to provide a machine for harvesting cucumbers in which the shaking of the cucumber is augmented by abutment with the cucumber in order to insure the removal of the cucmbers from the vines.

It is also an object of the invention to provide a machine for harvesting cucumbers which is capable of obtaining cucumbers which grow adjacent to the location at which the vine extends from the ground.

In one embodiment of the invention, the machine for harvesting cucumbers and the like from vines as the machine is moved adjacent to the vines includes means for conveying the vines extending from the ground relative to the machine along a path of travel which is elevated above the ground at a speed relative to the machine substantially equal to the speed of the machine relative to the ground. In this way, the vines are merely elongated but not otherwise disturbed by the passage of the machine since the relative velocity of the vines with respect to the ground is zero. The machine further includes means for supporting the vines with the cucumbers hanging thereform as the vines continue to be conveyed. The machine also includes means for shaking the supporting means in a direction extending transversely with respect to the path of travel to impart relative motion between the vines and the cucumbers attached thereto. With this arrangement, the shaking of the supporting means enables the cucumbers to be separated from the vines without removing the vines from the ground and without damaging the vines.

In another embodiment of the invention, the cucumbers are supported by a plurality of bars which extend parallel to the line of travel of the machine. The bars are spaced apart with respect to one another and the cucumbers pass between the bars. Upon the shaking of the plurality of bars, the cucumbers hanging between them are separated from the vines.

In still another embodiment of the invention, the plurality of bars increase in vertical thickness from the forward to the rearward portions of the bars. The tapered construction enables cucumbers to be removed from the vines regardless of the length of the stems connecting the cucumbers to the vines.

In an additional embodiment of the invention, there is provided a plurality of elongated members or prods underlying the plurality of bars supporting the vines. Upon shaking of the plurality of bars, the elongated members contact the cucumbers hanging between the bars and assist in the removal of cucumbers from the vines.

In a further embodiment of the invention, means are provided for urging the cucumbers adjacent to the root portion of the vine toward the conveying means of the machine. This construction enables the machine to harvest cucumbers which are directed away from the major portion of the vine.

For a better understanding of the invention as well as other objects and future features thereof, reference is made to the following detailed description to be read in conjunction with the attached drawings:

FIG. 6 is a plan view of the machine of the invention when conditioned to straddle a double row of vines;

Figure 7:
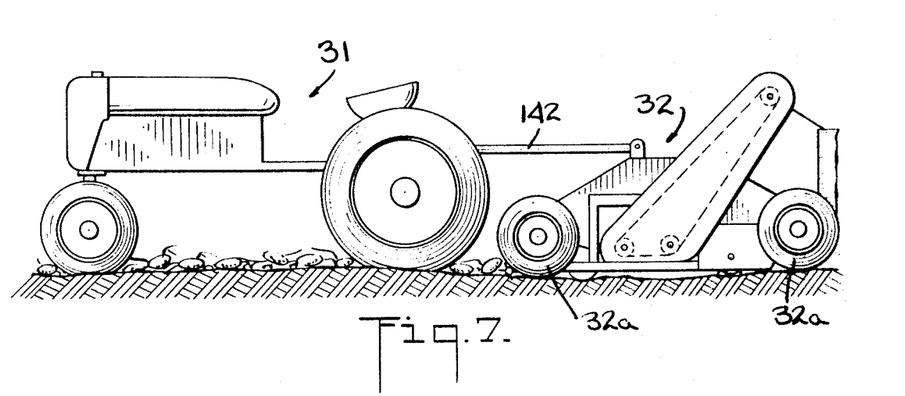
FIG. 7 is a side elevation view of the machine of the invention when mounted independently of the tractor which tows the machine.

The machine of the invention can be provided as attachment 30 for farm tractor 31 (FIGS. 1, 2 and 3) or the machine of the invention can be provided as an integral unit 32 which is adapted to be towed by farm tractor 31 (FIG. 7).

In preparing the cucumber crop for ultimate harvesting by the machine in the invention, it is necessary to set the cucumber plants in rows 33 which are spaced apart at an interval greater than the length of the vine of a matured plant. After planting, vines 34 of the cucumber plants tend to grow in a random direction with respect to the root of the plant. In spite of this characteristic, experiments have shown that vines 34 can be conveniently trained to grow substantially in one direction extending away from row 33. The training of the vines consists of moving the vines in a transverse direction with respect to the row either by hand, by blowing the vines with an air blast or other similar techniques.

Figures 1, 2:
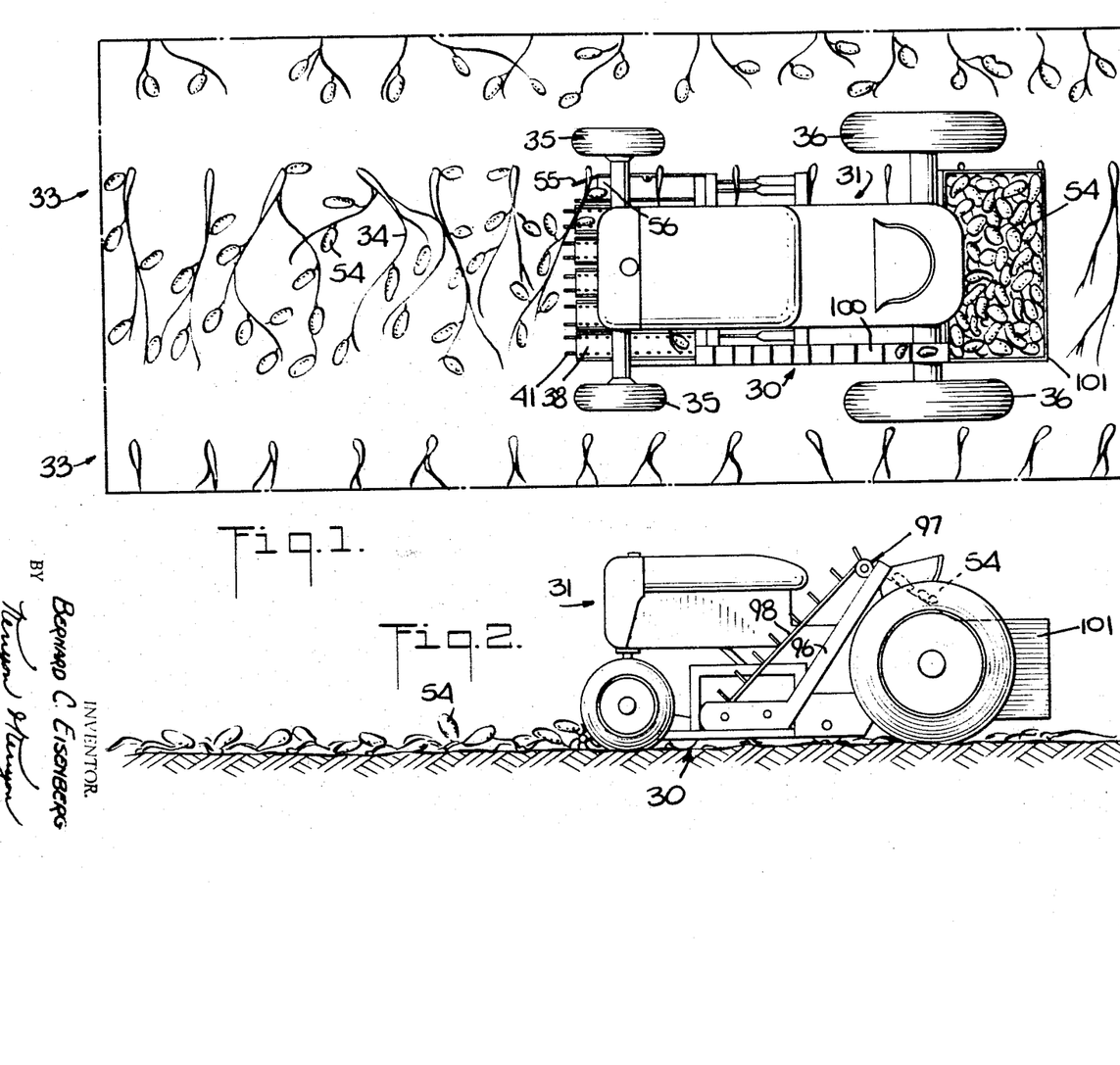
FIG. 1 is a plan view of the machine of the invention positioned over a trained row of cucumber vines.
FIG. 2 is a side elevation view of the machine of the invention.
Figure 14:
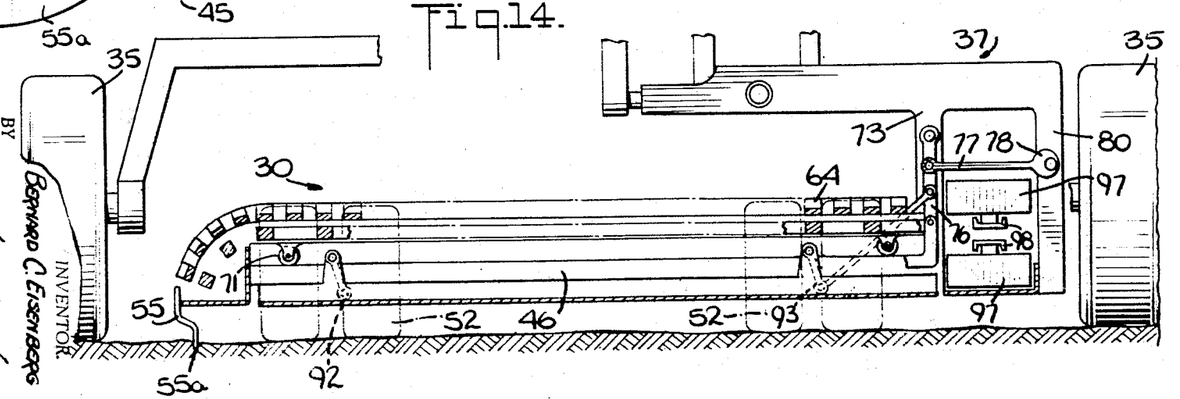
FIG. 14 is a fragmentary vertical section view showing the supporting means and the receiving surface of the machine in relation to the ground.

As shown in FIG. 1, wheels 35 and 36 of tractor 31 are spaced at intervals sufficient to straddle vines 34 of a given row 33. Thus as shown in FIG. 1, the line of travel of the machine of the invention is substantially at right angles to the direction at which the vines are trained. As shown in FIG. 14, attachment 30 of the invention is suspended by mounting 37 from the tractor at the left-hand portion thereof and extends transversely with respect to the tractor. Thus the machine is adapted to extend beneath the vines from the left-hand side toward the right-hand side of the row of the vines as viewed from the tractor when looking forward.

Figure 8:
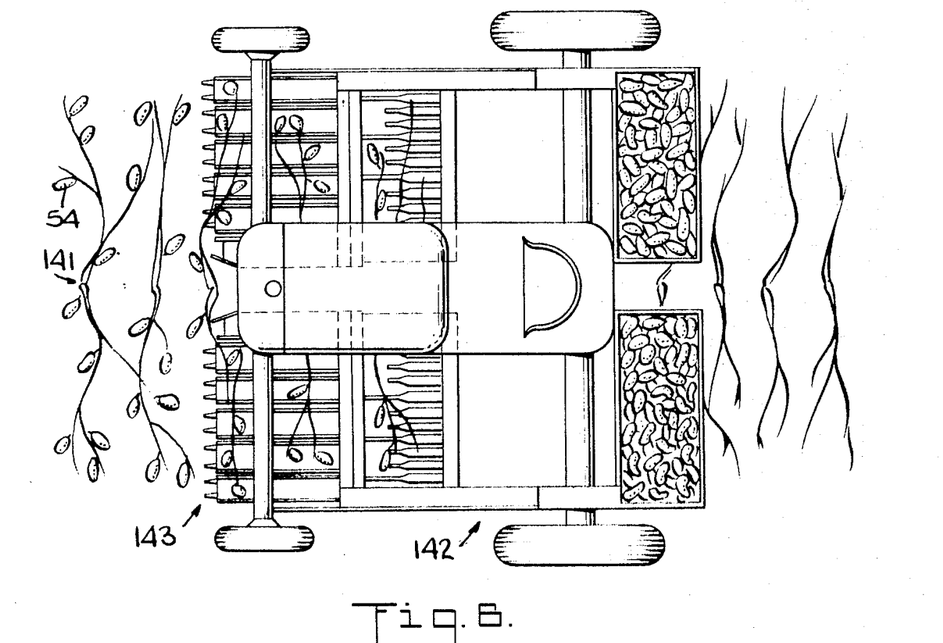
FIG. 8 is a vertical section view of the drives to the conveyors of the machine of the invention when the machine is mounted on a wheeled tractor.
Figure 9:
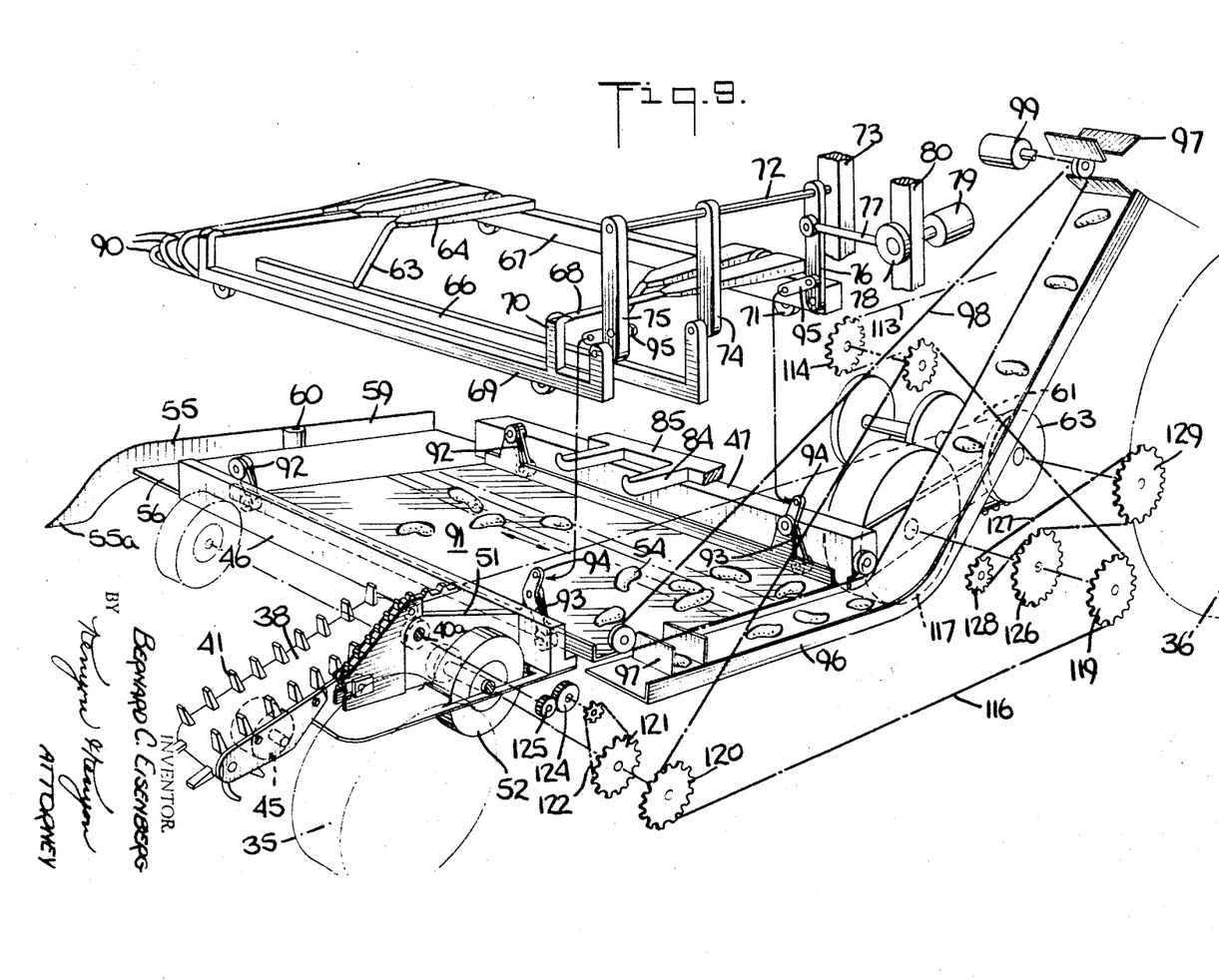
FIG. 9 is a fragmentary exploded perspective drawing of the supporting means and the means for shaking the supporting means.
Figure 10:
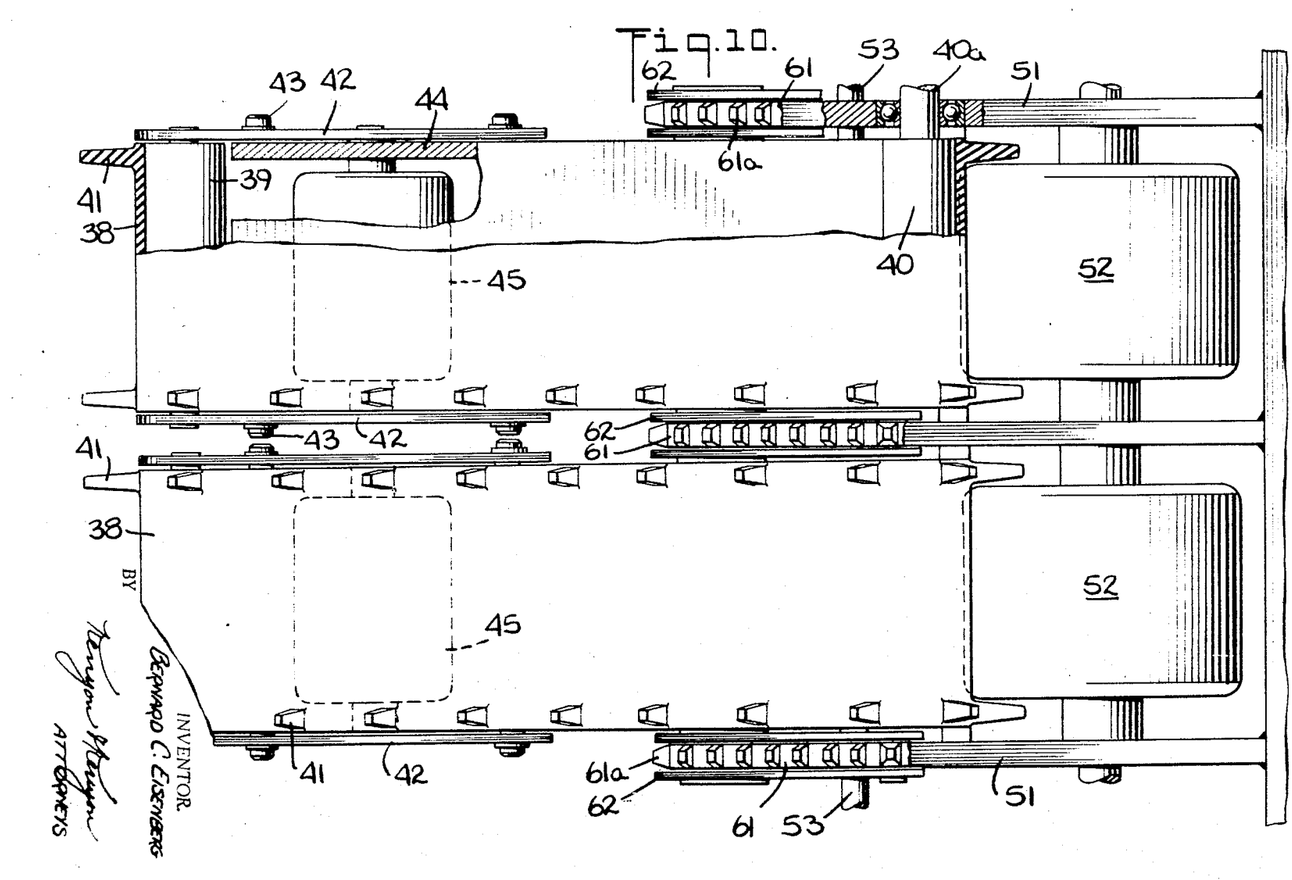
FIG. 10 is a fragmentary plan view of the conveyor for initially engaging the vines and the additional conveyor for advancing the vines through the machine.

The means for conveying the vines extending from the ground relative to the machine along a path of travel which is elevated above the ground and at a speed relative to the machine which is substantially equal and opposite to the speed of the machine relative to the ground initially includes a plurality of conveyors or belts 38 disposed about pulleys 39 and 40 (FIGS. 8–10). The belts include resilient projections or teeth 41 of rubber-like material extending outwardly from the exposed surface of the belts.

Figures 12, 18:
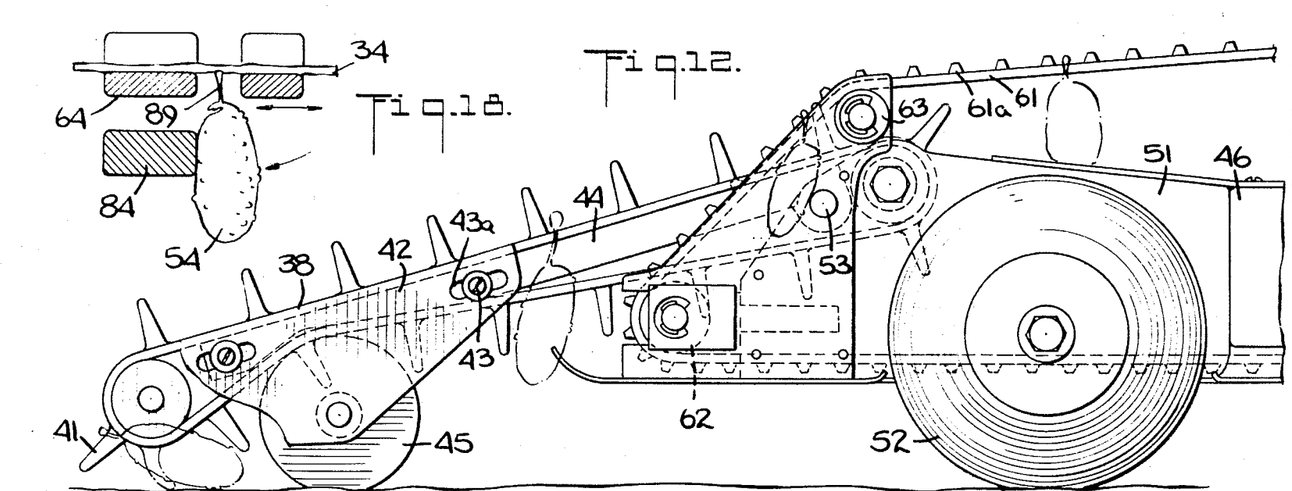
FIG. 12 is a fragmentary vertical section view of the conveyor for engaging the vines adjacent to the ground.
FIG. 18 is a fragmentary vertical section view showing a cucumber in engagement with the elongated member disposed beneath a pair of the supporting bars.
Figure 13:
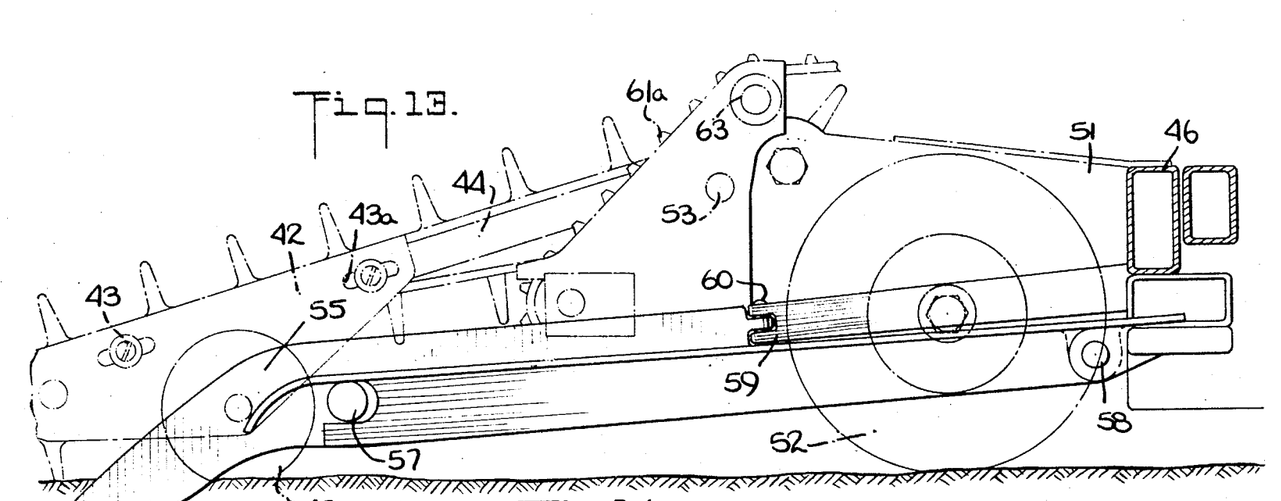
FIG. 13 is a side elevational view of the forward portion of the machine of the invention.

Pulleys 39 are mounted between side plates 42 which are attached by screws 43 to arms 44 (FIGS. 10, 12 and 13). Rollers 45 are pivotally mounted within side plates 42 and are adapted to travel along the ground at the forward portion of the machine and support belts 38 in a position adjacent to the surface of the ground. As a result, teeth 41 are adapted to brush along the surface of the ground and thereby engage and elevate both the vines and the cucumbers as the machine is advanced (FIG. 12). The tension of belts 38 which pass over the surface of rollers 45 is set by the adjustment of side plates 42 having elongated openings 43a through which screws 43 extend.

Figure 19:
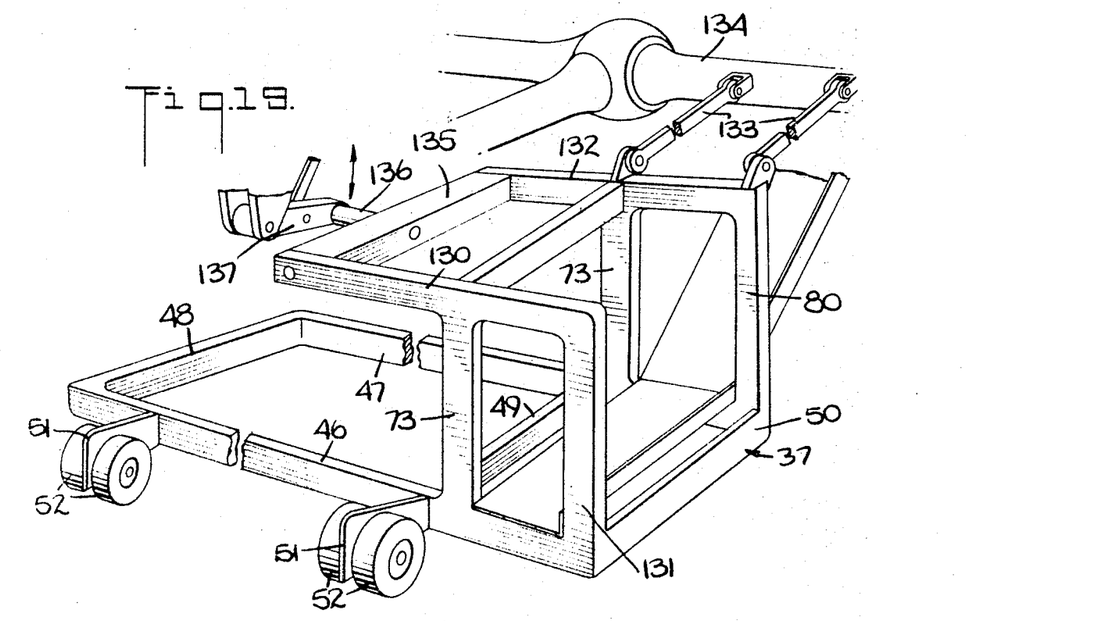
FIG. 19 is a fragmentary perspective view looking toward the rear portion of the tractor and showing the movable frame of the machine of the invention.

As shown in FIG. 19, mounting 37 for the machine includes transverse rails 46 and 47 and longitudinal rails 48–50. Brackets 51 extending forward from rail 46 serve as the supports for pairs of wheels 52. Since arms 44 are pivotally attached by pins 53 (FIGS. 10 and 12), arms 44 can swing up and down with respect to the remainder of the machine and thereby enable rollers 45 and belts 38 to follow the surface of the ground.

Figure 11:
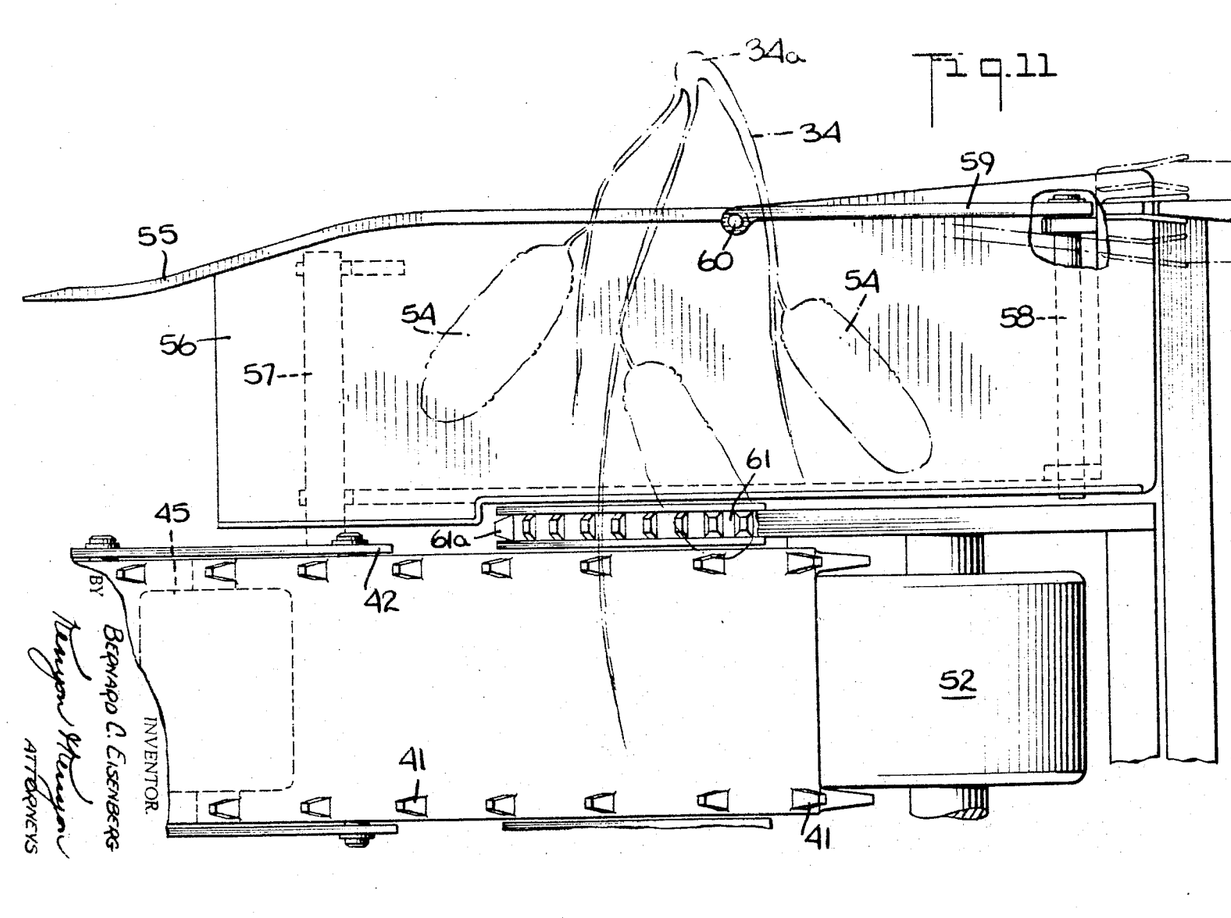
FIG. 11 is a fragmentary plan view of the front portion of the machine adjacent to the root portion of the vine and showing the passage of the cucumbers from the conveyor to the additional conveyor.

As shown in FIGS. 11 and 13, cucumbers 54 grow adjacent to root portion 34a of vines 34. In order to facilitate the entry of cucumbers 54 growing adjacent to root portion 34a, the machine is provided with deflector 55 which is adapted to direct the cucumbers onto slide 56. Slide 56 is supported at the forward portion thereof by shaft 57 extending from side plate 42 adjacent thereto. The rear portion of slide 56 is pivotally mounted with respect to the mounting of the machine by shaft 58. Side rail 59 is pivotally attached by pin 60 to deflector 55.

Deflector 55 at the forward portion 55a thereof is extended downwardly somewhat in the manner of a plow so that the deflector can pass beneath vines 34 and any cucumbers adjacent to root portion 34a as the machine advances (FIG. 13). In this way, the deflector can plow underneath the vines and the cucumbers and direct the cucumbers to enter upon slide 56. The relationship of deflector 55 and end portion 55a with respect to root portion 34a of vine 34 is further shown in FIG. 16.

Figure 16:
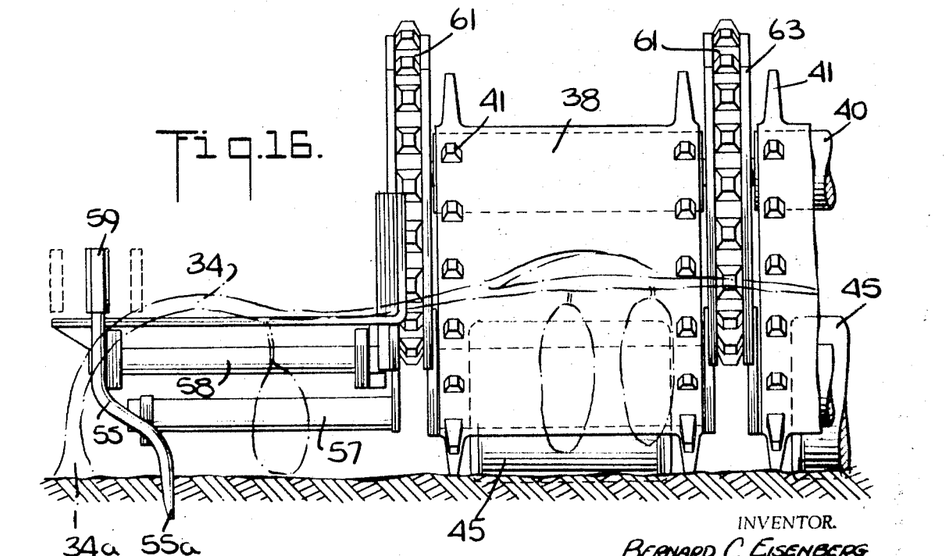
FIG. 16 is a fragmentary front view of the machine of the invention showing the cucumbers entering onto the conveyor at the forward portion of the machine.

The conveying means of the machine of the invention further includes conveyors or belts 61 which extend about pulleys 62 disposed between belts 38 (FIGS. 10 and 16). Belts 61 are provided with resilient teeth 61a along the exposed portion of the belt. Teeth 61a are adapted to receive and engage vines 34 from teeth 41 of belts 38. Belts 61, after engaging vines 34, advance or convey the vines rearwardly along a path of travel extending at a slightly upwardly inclined angle. Further as shown in FIG. 12, belts 61, after passing about pulleys 62, extend about pulleys 63 adjacent to the upper reaches of belts 61. Belts 61 then continue through the machine toward the rear portion thereof and pass about drive pulley 63 (FIG. 8).

Figure 20:
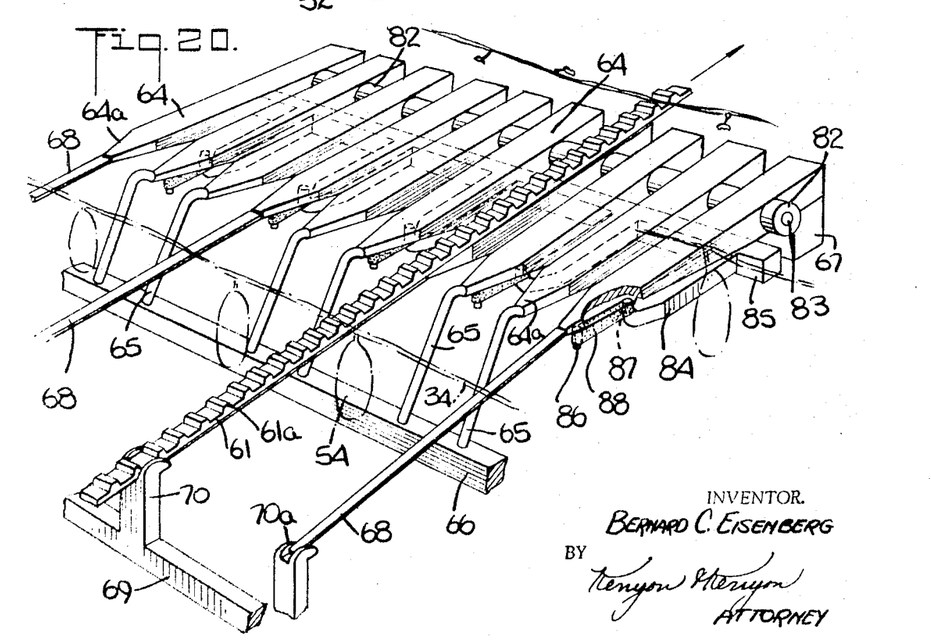
FIG. 20 is a fragmentary perspective view looking toward the rear of the bars, guide members and elongated members of the supporting means of the invention.

The means for supporting the vines with the cucumbers hanging therefrom as the vines are being conveyed includes a plurality of bars 64 which have a substantially flat upper surface (FIGS. 9 and 20). At the forward portion 64a of the bars they are tapered into a V-shaped form pointed toward the front of the machine. Guide members 65 extend upwardly from rail 66 to the forward portion of the bars. As shown in FIG. 20, bars 64 have a progressively increasing vertical thickness when measurements are taken in the direction of the rear portion of the bars.

Certain of bars 64 are provided with supports extending from the forward portion of the bars to uprights 68 mounted upon frame member 69 (FIGS. 9 and 20).

The attachment of bars 64 at the rear portion thereof to rail 67, the attachment of guide members 65 to rail 66, and the attachment of support 68 to upright 70 extending from rail 69 results in rails 66, 67 and 69 being held together in the form of a carriage or assembly. By means of wheels 71 mounted upon rails 67 and 69, the carriage or assembly can be mounted for rolling movement upon transverse rails 46 and 47 (FIG. 9).

Shaft 72 is mounted between vertical frame members 73 (FIGS. 9 and 19). Links 74 and 75 pivotally connect shaft 72 to rails 66 and 69, respectively. In addition, link 77 couples eccentric 78 to link 76. Hydraulic motor 79 mounted upon vertical frame member 80 drives eccentric 78. With motor 79 operating, it can be seen that eccentric 78 transmits a transverse reciprocating or vibratory motion to the assembly including the plurality of bars 64. The rolling support of wheels 71 with the transverse rails of the mounting enables the reciprocation to take place with the minimum of restraint.

As shown in FIG. 20, between the rearward portion of bars 64 there is provided a plurality of rolling members or rollers 82, formed for example of plastic material and pivotally mounted upon shaft 83. The rollers prevent any cucumbers which are too small to be harvested from being tangled as the vine passes beyond the rails. Belts 61, due to the elastic nature of their construction, can move and flex with the assembly of bars as it is reciprocated by motor 79. In order to maintain belt 61 in proper alignment, it is extended through guides 81 at the rearward portion of the bars and between guides 70a at the top portion of uprights 70, where support 68 joins the upright.

Figure 15:
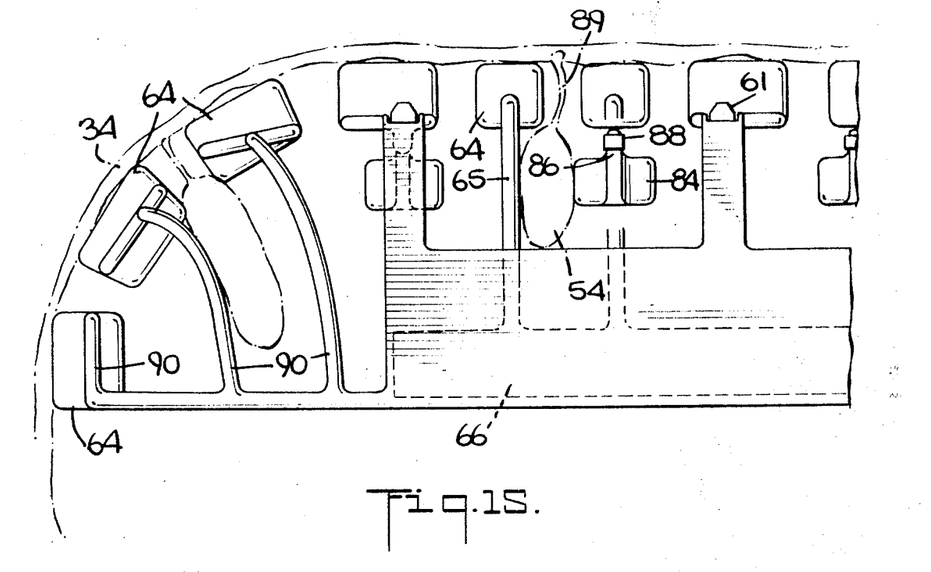
FIG. 15 is a fragmentary vertical section view showing the arrangement of supporting bars at the location thereof which is adjacent to the root portion of the vine.
Figure 17:
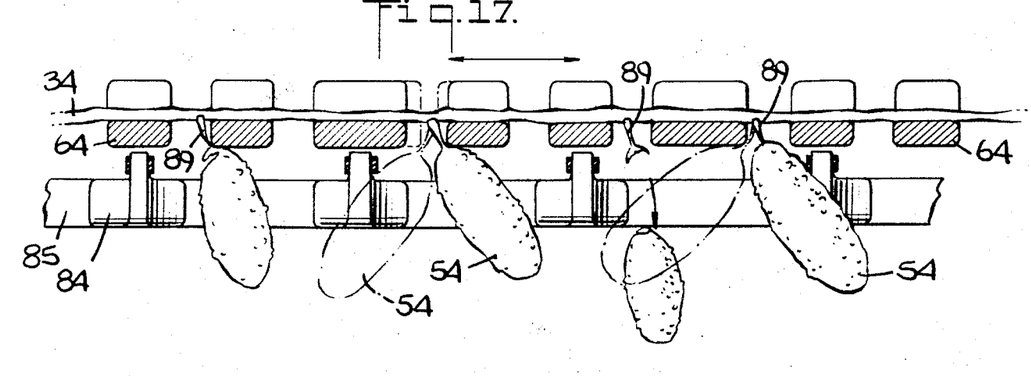
FIG. 17 is a fragmentary vertical section view showing the interaction between the cucumbers and both the plurality of bars and plurality of elongated members in removing the cucumbers from the vines.

The abutting means or elongated members 84 extend from base 85 which is mounted upon transverse rail 47 (FIGS. 9 and 20). As shown in FIGS. 15 and 17, elongated members or prods 84 are disposed beneath bars 64 and may be positioned to correspond to alternate bars so that there are approximately half as many prods as bars.

As the vines are conveyed by belts 61 toward guide members 65, cucumbers 54 can hang vertically from vine 34 (FIG. 20). As the vine approaches the forward portion 64a of bars 64, cucumbers which contact guide member 65 are diverted in a transverse direction so that the cucumber can pass freely between an adjacent pair of bars 64. Bars 64 are provided with downwardly extending studs 86 while prods 84 are provided with upwardly extending studs 87 (FIG. 20). A resilient connection is provided between the studs by means of band 88 of elastic material such as rubber. The bands prevent any entanglement of the vines or leaves as the cucumbers pass between bars 64 and approach prods 84.

Due to the reciprocating motion of the bars, the cucumbers overlying the bars are set into a swinging motion such as that shown in FIG. 17. The swinging of stem 89 about bar 64 enables the edge of the bar contacting the stem to act as a fulcrum point which tends to split or peel the point of engagement of the skin from the cucumber. The fact that bars 64 vary in thickness in the vertical direction enables stems of varying length, that is the distance of the stem from the vine to the cucumber to be effectively engaged by bar 64 at some point along the length of the bar. Thus, in the case of a short stem, the cucumber would be deflected about the bar and result in the peeling off of the stem at the forward portion of the bar. On the other hand, in the case of a very long stem, it is possible for the cucumber to pass toward the rear portion of bars 64 which have the greatest vertical dimension. In this location the long stem is pulled about the fulcrum provided by the thick portion of the bar and again the peeling action takes place.

Due to the tough nature of the stem and its attachment to the cucumber, it is possible that the swinging action alone is insufficient to sever the stem from the cucumber. This problem is overcome by prods 84 as shown in FIGS. 15, 17, and 18. Here it can be seen that the swinging of the cucumber against the prod can assist in applying sufficient tensile force to the attachment of the stem to the cucumber to cause the stem to be peeled from the cucumber. Thus the prods act in conjunction with or assist the pulling of the stems about bars 64 as a consequence of the swinging motion.

In the case of small cucumbers which are not sufficiently natured for harvesting, the relatively low mass of the small cucumber is insufficient to cause peeling of the stem during swinging or abutting. Thus the machine of the invention is selective in that it only harvests cucumbers larger than the minimum desired size.

As shown in FIGS. 9 and 15, bars 64 adjacent to the right hand portion of the machine, when looking in the forward direction, are curved in a manner to conform to the radius of curvature of vine 34 so that undue force or entanglement is prevented from damaging the vine. Guide members 90 extending rearwardly from rail 69 engage the forward portion of bars 64 at the right hand side of the machine.

The receiving surface for the cucumbers stripped from the vines by bars 64 and prods 84 includes tray 91. Tray 91 is mounted for a swinging or an oscillating motion with respect to transverse rails 46 and 47 by links 92 and 93. Cranks 94 attached to links 93 are pivotally connected to links 95 which in turn are pivotally connected to links 75 and 76. With this construction the swinging motion imparted to links 95 by the action of eccentric 78 is imparted to tray 91. The motion imparted to tray 91 is conditioned to cause cucumbers 54 to migrate toward chute 96 extending along the left hand portion of the machine. The dash lines in FIG. 9 represent V-shaped grooves which serve as guides for the moving cucumbers and prevents them from rolling about the tray.

The cucumbers are advanced along the upwardly extending portion of chute 96 by means of flights 97 which are driven rearwardly in the upward direction by chain 98. Hydraulic motor 99 serves to drive the chain. At the uppermost portion of chute 96, cucumbers 54 are released onto slide 100 which delivers the cucumbers to hopper 101 mounted at the rear portion of the tractor (FIGS. 1 and 2).

Figures 3, 4, 5:
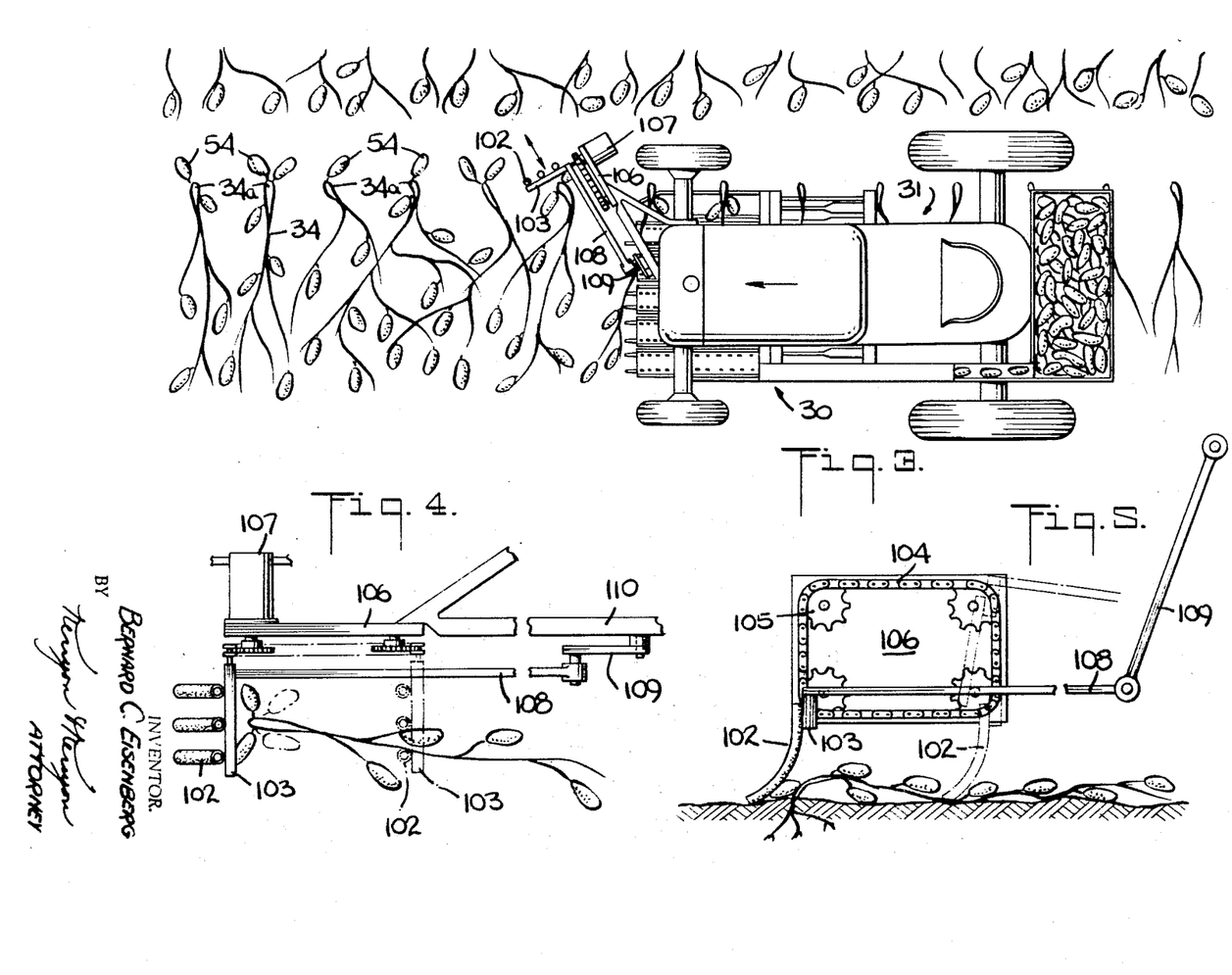
FIG. 3 is a plan view of an accessory for the machine of the invention which is adapted to direct cucumbers adjacent to the root portion of the vine toward the remaining portion of the vine.
FIG. 4 is a fragmentary plan view of the accessory shown in FIG. 3.
FIG. 5 is a fragmentary vertical section view of the accessory shown in FIG. 3.

As shown in FIG. 3, cucumbers 54 adjacent to root portion 34a of vines 34 can extend in a direction opposite to that to which the vines have been trained. In such a case, the cucumbers extending in the opposite direction to the vines cannot be directed toward slide 56 by deflector 55. To overcome this problem, the machine of the invention can be provided with directing means or rake 102 attached to arm 103 which in turn is secured to endless roller chain 104 (FIGS. 3–5). Chain 104 is extended about sprockets 105 which are mounted upon support plate 106. Hydraulic motor 107 is connected to one of the sprockets for driving the chain.

In order to maintain arm 103 in a predetermined position which establishes the raking position of rake 102, rod 108 is fixedly attached to arm 103. Idler arm 109 pivotally attaches rod 108 to support member 110 which mounts support plate 106 on the tractor. As shown in FIG. 5, rakes 102 are moved to the right during the initial stroke. Subsequently the rakes are elevated by the travel of the chain, moved to the left as shown in FIG. 5, and then lowered toward the ground for another raking motion to the right. With this arrangement, cucumbers extending opposite to the direction of training of the vines can be brought to deflector 55 and thereby insured of entering into the machine.

Various drives for the machine of the invention are shown in FIGS. 8 and 9. Sprocket 111 connected to axle 112 for tractor wheel 36 can serve as a source of power. Chain 113 transmits the drive from sprocket 111 to sprocket 114. Sprocket 114 is connected to sprocket 115 which is in engagement with chain 116. The rear portion of the machine of the invention is supported by wheels 117 having lugs 118. Sprocket 119 engaged to chain 116 transmits drive to wheels 117. Chain 116 through sprocket 120 drives wheels 52 at the forward portion of the machine. In addition to driving wheels 52, sprocket 120 also drives sprocket 121 to which chain 122 is engaged. By means of sprocket 123, the drive from chain 122 is transmitted through gears 124 and 125 to shaft 40a upon which the pulleys 40 are mounted (FIGS. 9 and 10).

The drive to pulley 63 for operating belts 61 is provided by sprocket 126 driven by sprocket 119 and engaged with chain 127. Chain 127 passes about idler sprocket 128 and about sprocket 129 which is connected to pulley 63. Since the various drives begin with sprocket 111 which is operated by the axle of the tractor, the rotation of sprocket 111 is related to the ground speed of the vehicle. Consequently, by the proper selection of the sprocket ratios, wheels 52 and 117 can be driven so as to roll along the ground as the tractor advances.

In a similar manner, the linear speed of belts 38 and 61 can be conditioned to have a linear speed equal and opposite to the speed of movement of the tractor. With this relationship, belts 38 and 61 are advanced in a rearward direction at the same velocity that the tractor is advanced in a forward direction. Consequently, the relative motion of the belts with respect to the ground is zero. Therefore, while the belts elevate the vines above the ground in order to permit the cucumbers to be separated from them, the belts do not tend to shift the vines in a longitudinal direction and therefore are prevented from damaging or uprooting the vines.

In order to enable the tractor, when equipped with the machine of the invention, to be moved in a convenient manner from one field of cucumbers to the next, mounting 37 is conditioned for elevation with respect to the tractor (FIGS. 8 and 19). The upper portion of mounting 37 includes rail 130 connected to vertical frame members 73 and 131. The mounting further includes rail 132 connected to vertical frame members 73 and 80. Links 133 which are pivotally attached to axle 134 of the tractor and rail 132 serve to maintain the mounting in a position substantially parallel to the horizontal axis of the axles. Rails 130 and 132 are connected by frame member 135 which is pivotally connected to shaft 136 extending from arm 137. Hydraulic actuator 138 is connected through bell-crank 139 and link 140 to arm 137. Thus in order to elevate the mounting, bell crank 139 is rotated in a clockwise direction, as seen in FIG. 8, thereby raising the link 140 and arm 137. The arm by means of shaft 136 then elevates mounting 137.

As shown in FIG. 6, it may be desired to train the cucumber vine in oppositely extending directions from a single row of plants 141. For such a form of planting, tractor 142 is provided with an exceptionally wide wheel tread. In addition, a double harvesting machine 143 in accordance with the invention is attached to the tractor. The half of machine 143 shown in FIG. 6 to the left of row 141 corresponds to the harvesting machine previously described. On the other hand, the portion of machine 143 to the right of row 141 is a mere mirror image of the machine previously described.

In the arrangement of FIG. 7, tractor 31 is connected by tow bar 142 to integral unit or harvesting machine 32. With such an arrangement, the power for operating the various drives and conveyors, similar to those discussed above with respect to attachment or machine 30, would be provided by wheels 32a. In the alternative, hydraulic, mechanical or electrical power can be transmitted to integral unit 32 in order to operate the various drives and conveyors.

While certain embodiments of the invention have been shown and described herein, it is to be understood that certain changes, additions and substitutions can be made without departing from the scope and spirit of the invention.

What is claimed is:

1. A machine for harvesting cucumbers and the like from vines as the machine is moved adjacent to the vines comprising means for conveying the vines extending from the ground relative to the machine along a path of travel which is elevated above the ground at a speed relative to the machine substantially equal and opposite to the speed of the machine relative to the ground, means for supporting the vines with the cucumbers hanging therefrom as the vines are being conveyed, and means for shaking said supporting means in a direction extending transversely with respect to the path of travel to impart relative motion between the vines and the cucumbers attached thereto, whereby the shaking of the cucumbers removes them from the vines extending from the ground.

2. A machine for harvesting cucumbers and the like according to claim 1 in which said conveying means extends substantially parallel to the line of movement of the machine with respect to the vines.

3. A machine for harvesting cucumbers and the like according to claim 1 in which said conveying means comprises a plurality of conveyors extending upwardly from adjacent the ground for elevating the vines and a plurality of additional conveyors extending from said plurality of conveyors and adjacent said supporting means.

4. A machine for harvesting cucumbers and the like in accordance with claim 3 in which said plurality of conveyors are pivotally mounted at one end portion thereof about a transverse axis disposed above the ground, and rolling means for supporting the other end portion of said plurality of conveyors adjacent to the ground.

5. A machine for harvesting cucumbers and the like in accordance with claim 3 in which said plurality of conveyors includes a plurality of endless belts having paths of travel parallel and adjacent to one another.

6. A machine for harvesting cucumbers and the like in accordance with claim 1 in which said means for supplurality of resilient projections extending from the surface of said belts in order to engage the vines as they are being picked up from the ground and during conveying.

7. A machine for harvesting cucumbers and the like in accordance with claim 3 in which said plurality of additional conveyors comprises a plurality of endless belts having paths of travel spaced apart and substantially parallel to one another.

8. A machine for harvesting cucumbers and the like in accordance with claim 7 and further comprising a plurality of resilient projections mounted upon the surface of said belts for engaging the vines and for conveying them.

9. A machine for harvesting cucumbers and the like in accordance with claim 1 in which said means for supporting the vines with the cucumbers hanging therefrom as the vines are being conveyed comprises a plurality of bars disposed with the upper surface thereof disposed in a plane which is substantially parallel to the ground, said bars being spaced apart from one another and extending substantially parallel to the lines of travel of the conveying means, whereby the cucumbers hanging from the vines can pass between the bars as the vines are conveyed adjacent to the upper surface of the bars.

10. A machine for harvesting cucumbers and the like in accordance with claim 9 in which said bars at the forward portion thereof with respect to the path of travel are tapered toward the forward end of said bars whereby the tapered forward end portions facilitate the entry of the cucumbers between the bars.

11. A machine for harvesting cucumbers and the like in accordance with claim 9 in which said plurality of bars have a progressively increasing vertical thickness, said thickness increasing toward the rear portion of said bars relative to the path of travel, the lower edge portion of the bars of increasing thickness being adapted to serve as a fulcrum about which the cucumbers are moved in response to said shaking means, whereby the harvesting of the cucumbers from the vines is insured for cucumbers having stems of varying length connecting them to the vines of varying length.

12. A machine for harvesting cucumbers and the like in accordance with claim 9 and further comprising a plurality of guide members extending upwardly and rearwardly with respect to the path of travel of the cucumbers to the forward portion of said bars, said guide members being adapted to engage the cucumbers hanging from the vines while the vines are engaged by the conveying means whereby the guide members deflect and align the cucumbers with the space between adjacent bars.

13. A machine for harvesting cucumbers and the like in accordance with claim 10 and further comprising guide members extending upwardly and rearwardly to the tapered forward portion of the bars, said guide members deflecting the cucumbers hanging from the vines to pass adjacent to the tapered portions of the adjacent bars.

14. A machine for harvesting cucumbers and the like in accordance with claim 9 in which said means for supporting the vines with the cucumbers hanging therefrom as the vines are being conveyed comprises an additional plurality of bars disposed with the upper surface thereof tangential to a curved plane extending from said plane, which is substantially parallel to the ground, toward the ground, said additional plurality of bars for accommodating the vines adjacent to where the vines extend from the ground.

15. A machine for harvesting cucumbers and the like in accordance with claim 9 in which the interval between said bars is predetermined in the transverse direction with respect to the path of travel in accordance with the size of the cucumber to insure that the cucumber encounters the lower portion of each of the bars adjacent to it during the shaking of the supporting means in order that the cucumber can be peeled from attachment to the vine.

16. A machine for harvesting cucumbers and the like in accordance with claim 9 and further comprising a rolling member disposed between the rearward portion of each of the plurality of bars in order to facilitate the advancement of any portion of the vines or of cucumbers insufficiently large to be harvested from entanglement with said supporting means prior to the vines and cucumbers being advanced beyond said supporting means.

17. A machine for harvesting cucumbers and the like in accordance with claim 14 in which said additional plurality of bars have a rounded projection extending from the upper surface of the bars adjacent the rear portion thereof, said rounded projection facilitating the conveying of the vines from the supporting means.

18. A machine for harvesting cucumbers and the like in accordance with claim 9 in which the bars of said plurality of bars adjacent to one side portion of the machine are disposed substantially tangential to a plane curving from the plane of the upper surfaces of the bars toward the ground, whereby said bars adjacent the side portion of the machine are adapted to support the vines in the extent thereof immediately adjacent to the ground.

19. A machine for harvesting cucumbers and the like in accordance with claim 18 and further comprising guide members extending upwardly and rearwardly with respect to the path of travel to the forward portion of each of said bars disposed with the upper surface thereof tangent to the curved plane, whereby the cucumbers adjacent to the side portion of the machine are directed by said guide members to pass between said bars.

20. A machine for harvesting cucumbers and the like in accordance with claim 1 in which said means for shaking said supporting means in a direction extending transversely with respect to the line of travel to impart relative motion between the vines and the cucumbers attached thereto comprises means for mounting said supporting means with freedom of movement in the transverse direction, and means for applying a transverse reciprocating motion to the supporting means.

21. A machine for harvesting cucumbers and the like in accordance with claim 20 in which said shaking means further comprises a linkage pivotally connected to said supporting means, a driving member pivotally connected to said linkage, and an eccentric drive coupled to said driving member, whereby a reciprocating drive is coupled through said linkage to said supporting means.

22. A machine for harvesting cucumbers and the like from vines as the machine is moved adjacent to the vines comprising means for conveying the vines extending from the ground relative to the machine along a path of travel which is elevated above the ground at a speed relative to the machine substantially equal and opposite to the speed of the machine relative to the ground, means for supporting the vines with the cucumbers hanging therefrom as the vines are being conveyed, means for shaking said supporting means in a direction extending transversely with respect to the path of travel to impart relative motion between the vines and the cucumbers attached thereto, and means for abutting the cucumbers hanging from said supporting means during the shaking thereof, whereby the shaking and abutting of the cucumbers removes them from the vines extending from the ground.

23. A machine for harvesting cucumbers and the like in accordance with claim 22 in which said means for abutting the cucumbers hanging from said supporting means during the shaking thereof comprises a plurality of elongated members spaced apart from one another and extending substantially parallel to the path of travel and below said supporting means, said elongated members being contacted by the cucumbers hanging from the supporting means during the shaking thereof, whereby the contact of the cucumbers with said elongated members enables said elongated members to prod the cucumbers from the vines.

24. A machine for harvesting cucumbers and the like in accordance with claim 23 in which each of said plurality of elongated members are tapered at the forward portion thereof relative to the path of travel in order to facilitate the entry of the cucumbers between the elongated members.

25. A machine for harvesting cucumbers and the like in accordance with claim 22 in which said means for supporting the vines with the cucumbers hanging therefrom as the vines are being conveyed comprises a plurality of bars extending substantially parallel to the path of travel of the machine and spaced apart from one another and in which said means for abutting the cucumbers hanging from said supporting means during the shaking thereof comprises a plurality of elongated members extending substantially parallel to the lines of travel of the machine below the plurality of bars, the interval between the elongated members being selected to enable the elongated members to intersect cucumbers hanging between pairs of said bars adjacent to said elongated member.

26. A machine for harvesting cucumbers and the like in accordance with claim 25 in which both the forward portions of the bars and the elongated members with respect to the path of travel are tapered in order to facilitate the passage of the cucumbers therebetween.

27. A machine for harvesting cucumbers and the like in accordance with claim 25 and further comprising a stud extending downwardly from the forward portion with respect to the path of travel of each of the plurality of bars and an additional stud extending upwardly from the forward portion with respect to the path of travel of each of the elongated members, and means for providing a resilient connection extending between each of said studs to said additional stud adjacent thereto, whereby said resilient connecting means directs the cucumbers to pass adjacent to the elongated member.

28. A machine for harvesting cucumbers and the like in accordance with claim 27 in which said connection providing means comprises an elastic band extending between each of said studs and said additional stud adjacent thereto.

29. A machine for harvesting cucumbers and the like from vines as the machine is moved adjacent to the vines comprising means extending substantially parallel to the line of travel of the machine for conveying the vines extending from the ground along a path of travel which is elevated above the ground at a speed substantially equal to the speed of the machine, means for supporting the vines with the cucumbers hanging therefrom as the vines are being conveyed, means for shaking said supporting means in a direction extending transversely with respect to the line of travel to impart relative motion between the vines and the cucumbers attached thereo, means for abutting the cucumbers hanging from said supporting means during the shaking thereof, and additional means for conveying the cucumbers harvested from the vines from the machine, whereby the shaking and abutting of the cucumbers removes them from the vines extending from the ground.

30. A machine for harvesting cucumbers and the like in accordance with claim 29 in which said additional means for conveying the cucumbers from the machine comprises a receiving surface underlying said supporting means and means for moving said receiving surface to urge the cucumbers received thereon to move toward a side portion of the machine.

31. A machine for harvesting cucumbers and the like in accordance with claim 30 in which said receiving surface extends transversely with respect to the machine and in which said moving means reciprocates said receiving surface in a transverse direction.

32. A machine for harvesting cucumbers and the like in accordance with claim 29 in which said additional means for conveying the cucumbers from the machine comprises a receiving surface underlying said supporting means, means for moving said receiving surface to urge the cucumbers received thereon to move toward a side portion of the machine, and a conveyor extending adjacent the side portion of the machine for receiving the cucumbers from said receiving surface and discharging the cucumbers from the machine.

33. A machine for harvesting cucumbers and the like in accordance with claim 32 in which said conveyor comprises an elongated belt member extending adjacent to said receiving surface and substantially parallel to the path of travel for conveying the cucumbers directly thereto from said receiving surface away from the machine.

34. A machine for harvesting cucumbers and the like from vines as the machine is moved adjacent to the vines comprising means for conveying the vines extending from the ground relative to the machine along a path of travel which is elevated above the ground at a speed relative to the machine substantially equal and opposite to the speed of the machine relative to the ground, means for deflecting cucumbers adjacent to the portion of the vines entering the ground to move these cucumbers toward said conveying means, means for supporting the vines with the cucumbers hanging therefrom as the vines are being conveyed, means for shaking said supporting means in a direction extending transveresly with respect to the path of travel to impart relative motion between the vines and the cucumbers attached thereto, and means for abutting the cucumbers hanging from said supporting means during the shaking thereof, whereby the shaking and abutting of the cucumbers removes them from the vines extending from the ground.

35. A machine for harvesting cucumbers and the like in accordance with claim 34 in which said deflecting means comprises a supporting surface extending in a substantially horizontal plane adjacent to a side portion of said conveying means and an elongated plate member parallel to the path of travel in a substantially vertical plane adjacent to the side portion of said supporting surface which is opposite said conveying means, said elongated plate member being adapted to urge the cucumbers toward said supporting surface.

36. A machine for harvesting cucumbers and the like in accordance with claim 35 in which the forward portion of said elongated plate member is curved toward said supporting surface.

37. A machine for harvesting cucumbers in accordance with claim 35 in which the forward portion of said elongated plate member extends downwardly to facilitate its passage beneath the vines and cucumbers.

38. A machine for harvesting cucumbers and the like from vines as the machine is moved adjacent to the vines comprising means extending substantially parallel to the line of travel of the machine for conveying the vines extending from the ground relative to the machine along a path of travel which is elevated above the ground at a speed relative to the machine substantially equal and opposite to the speed of the machine relative to the ground, means for raking the cucumbers adjacent to the portion of the vines entering the ground to move toward the cucumbers said conveying means, means for supporting the vines with the cucumbers hanging therefrom as the vines are being conveyed, means for shaking said supporting means in a direction extending transversely with respect to the path of travel to impart relative motion between the vines and the cucumbers attached thereto, and means for abutting the cucumbers hanging from said supporting means during the shaking thereof, whereby the shaking and abutting of the cucumbers removes them from the vines extending from the ground.

39. A machine for harvesting cucumbers and the like in accordance with claim 38 in which said raking means comprises a plurality of resilient tines disposed adjacent a side forward portion of said conveying means and means for imparting a raking motion to said tines, said motion being directed along a line extending toward said conveying means.

40. A method of operation of a machine for harvesting cucumbers and the like from vines while the machine is moved adjacent to the vines comprising the steps of conveying the vines extending from the ground relative to the machine along a path of travel which is elevated above the ground at a speed relative to the machine substantially equal and opposite to the speed of the machine relative to the ground, supporting the vines with the cucumbers hanging therefrom as the vines are being conveyed, shaking the vines being supported in a direction extending transversely with respect to the path of travel to impart relative motion between the vines and the cucumbers attached thereto, whereby the shaking and abutting of the cucumbers removes them from the vines extending from the ground.

41. A method in accordance with claim 40 in which said step of conveying comprises lifting the vines from the ground and moving the vines rearwardly at a speed equal to the forward speed of the machine, whereby the vines are elevated by the passage of the machine.

42. A method in accordance with claim 40 in which said step of supporting the vines includes passing the vines over a plurality of spaced substantially horizontally disposed bars extending substantially parallel to the path of travel in order to permit the cucumbers to hang pendulously from the vines and between the bars.

43. A method in accordance with claim 42 in which the step of shaking comprises shaking the vines laterally while supported on said bars.

44. A method in accordance with claim 40 in which said step of abutting comprises striking the cucumbers hanging from the vines as the supported vines and cucumbers are subjected to shaking.

45. A method in accordance with claim 40 and further comprising the step of laterally deflecting cucumbers adjacent to the portion of the vines extending from the ground to insure that the cucumbers are conveyed.

46. A method in accordance with claim 40 and further comprising the step of raking cucumbers adjacent to the portion of the vines extending from the ground to enable the cucumbers to be conveyed.

References Cited
UNITED STATES PATENTS

| | | | |
|---|---|---|---|
| 2,841,947 | 7/1958 | Grew | 56—327 |
| 3,078,926 | 2/1963 | Ries et al. | 171—14 |

RUSSELL R. KINSEY, Primary Examiner